United States Patent [19]

Hall

[11] Patent Number: 4,890,672

[45] Date of Patent: Jan. 2, 1990

[54] METHOD OF CONTROLLING THE FLOW OF LANDFILL GAS FROM SANITARY LANDFILLS AND APPARATUS FOR PERFORMING THE METHOD

[75] Inventor: Lars Hall, Lidingö, Sweden

[73] Assignee: RAGN-SELLSFORETAGEN AB, Sweden

[21] Appl. No.: 261,712

[22] Filed: Oct. 24, 1988

[30] Foreign Application Priority Data

May 26, 1987 [SE] Sweden ............................. 87022174

[51] Int. Cl.$^4$ ...................... E21B 43/12; E21B 47/06
[52] U.S. Cl. .................................... 166/250; 166/50; 166/53; 166/64; 166/90; 166/369; 166/370; 73/154
[58] Field of Search .................. 166/50, 53, 64, 90, 166/250, 369, 370; 73/154; 405/129

[56] References Cited

U.S. PATENT DOCUMENTS

| | | | |
|---|---|---|---|
| 4,026,355 | 5/1977 | Johnson et al. | 166/246 |
| 4,276,778 | 7/1981 | Ham | 166/250 X |
| 4,442,901 | 4/1984 | Zison | 166/50 X |

FOREIGN PATENT DOCUMENTS

| | | |
|---|---|---|
| 0182143 | 4/1987 | European Pat. Off. |
| 2719889 | 9/1978 | Fed. Rep. of Germany |
| 3705902 | 10/1987 | German Democratic Rep. ............... 405/129 |

OTHER PUBLICATIONS

J. Chem. Tech. Biotechnol., 1980, vol. 30, pp. 458-465.
Chemical Abstracts, 1984, 101:57654z "Possibiliites of Biogas Recovery from Danish Refuse Dumping Sites" Crone og Koch, Raadgivende Ingenioerfirma K/S (Viborg, Den). Report 1983.

Primary Examiner—George A. Suchfield
Attorney, Agent, or Firm—Laff, Whitesel, Conte & Saret

[57] ABSTRACT

A method of controlling the recovery of landfill gas from a sanitary landfill and apparatus for performing the method. Landfill gas, which mainly consists of methane and carbon dioxide, is formed by anaerobic decomposition of the organic content of the refuse. This process develops a very small amount of heat. If more gas is drawn from the sanitary landfill than is formed by the anaerobic decomposition, air is drawn into the landfill. The decomposition thereby becomes aerobic, developing large quantities of heat and increasing the content of carbon dioxide and nitrogen in the gas. According to the disclosed method, the temperature of the gas from each gas well is measured, thereby providing information for controlling the flow of gas from the corresponding wells. The apparatus disclosed by the invention comprises a control chamber connected to one or more gas wells on the one hand and to a gas furnace over a gas fan on the other hand. A temperature meter located in the gas flow is connected to a microprocessor which is connected to an adjustment valve located in the control chamber.

8 Claims, 1 Drawing Sheet

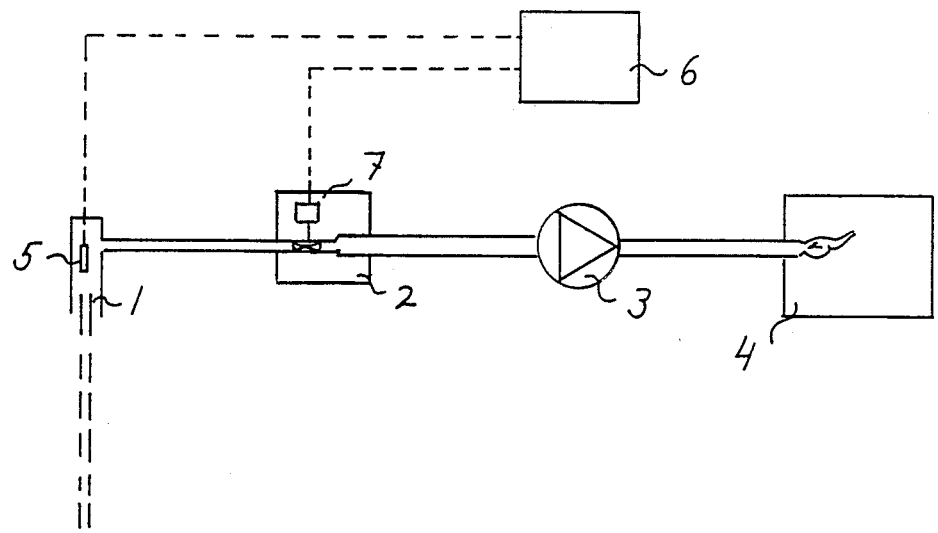

METHOD OF CONTROLLING THE FLOW OF LANDFILL GAS FROM SANITARY LANDFILLS AND APPARATUS FOR PERFORMING THE METHOD

BACKGROUND OF THE INVENTION

1. Field of the Invention

The present invention concerns a method of controlling the recovery of landfill gas from a sanitary landfill by measuring the temperature of the gas and by adapting the gas withdrawal thereby as well as apparatus for performing the method.

2. Description of the Prior Art

In a landfill of domestic refuse and specific types of industrial waste, so-called landfill gas is formed after some time in consequence of the decomposition of the organic contents of the refuse. The landfill gas commonly consists of 50-60% methane, about 40% of carbon dioxide and 2-10% of nitrogen. The landfill gas is formed under anaerobic conditions, i.e. absence of air.

The anaerobic decomposition of the organic material in the waste to landfill gas is a slightly exothermic process, i.e. a very small quantity of heat is developed. If oxygen is supplied to the refuse, for example by penetration of air, an aerobic decomposition of the organic material to mainly carbon dioxide and water occurs. This aerobic process is highly exothermic, i.e. large quantities of heat are developed in connection with the decomposition process.

Landfill gas is generally recovered from a sanitary landfill by perforated tubes being urged downwardly from the surface into the landfill. In order to prevent air from mixing with the landfill gas the upper 80-160 inches of the tube must not have perforations. The gas is commonly supplied from such type of a so-called gas well through a conduit to a control chamber. In this chamber the gas conduit coming from the gas well is provided with a valve for controlling the gas flow and a gas stoplet for analysis samples. Gas conduits are connected to a control chamber of this type from a plurality of gas wells, normally 2-6 of such wells. These conduits are thereafter combined in the control chamber so as to form a manifold through which the gas is drawn to a fan or a compressor. This equipment then urges the gas on to the place of utilization which may be a furnace or boiler, a gas engine, etc.

The gas well and the conduit system are subjected to negative pressure up to the fan. If the quantity of gas which is withdrawn from the gas well is greater than the quantity of gas which is formed in the sanitary landfill around the gas well, air will be drawn into the landfill. The decomposition process in the landfill will then partly be aerobic, which i.a. causes the methane content of the gas to decrease and the nitrogen content of the gas to increase. The oxygen content normally only increases slightly, as the major part of the oxygen included in the air being drawn in will be consumed in the aerobic decomposition process in the refuse. As has been mentioned earlier a substantial amount of heat is developed in the aerobic decomposition process, and in drawing in air into the sanitary landfill the temperature of the recovered gas will consequently increase.

In order to achieve high economy in recovering gas from the sanitary landfill, there is a desire to withdraw as much gas as possible from each gas well without incurring the risk of having air drawn into the landfill. Up to now this problem has been solved by regularly checking the methane content of each gas well. As this check normally is carried out at intervals of 4-6 weeks, it becomes very demanding in terms of work and is also expensive. As the result of the lengthy intervals between the tests, air may be drawn into the landfill during a relatively long period before this is discovered. A gas having a low methane content will then be the result, but the greatest danger is that the anaerobic decomposition process is slowed down, and it may take a long time to make this operate satisfactorily again.

On the market there are automatic gas analyzers which can be interconnected to each gas well via gas conduits and can analyze outgoing gas continuously. Equipment of this type is described in European Patent EP 0 182 143, according to which landfill gas is drawn from each gas well to an automatic gas analyzer in which the content of gas of any one of the components $O_2$, $N_2$, $CO_2$ or $CH_4$ is determined. This measured value will then control the withdrawal of gas from the respective gas well. A control system of this type is of course extremely expensive to set up, and furthermore it requires qualified maintenance of specific system components.

Another way of avoiding having air drawn into the sanitary landfill is described in German Patent Specification DE 27 19 889. According to this publication the pressure inside the sanitary landfill is measured at different gas withdrawal flows before the landfill gas system is set into routine production. That flow is then determined at which the pressure in the landfill in the immediate vicinity of the gas well is the same as the atmospheric pressure. This is the maximum permissible gas withdrawal. After the system has been put into routine production this maximum gas withdrawal must not be exceeded.

The manner of achieving the greatest possible quantity of gas from refuse is described in J. Chem. Tech. Biotechnol., 1980, Volume 30, pages 458-465, wherein the microbiological conditions for anaerobic decomposition with mesophilic microorganisms are described. The author thereafter explains how the moisture content and the temperature affect the reaction rate and finally which external changes can be carried out in the form of insulating the landfill and increasing the moisture content of the refuse so as to improve the gas production.

SUMMARY OF THE INVENTION

The purpose of this invention is to find an inexpensive method of obtaining information, when the gas system is in operation, on whether too much landfill gas is withdrawn from a gas well, i.e. if air is drawn into the landfill at the gas well, i.e. if air is drawn into the landfill at the gas well, and to disclose apparatus for performing this method. The desired result is attained in such manner that the strong development of heat which occurs when air is supplied to the refuse is utilized as an indicator. In this aerobic process the exhaust gas will become considerably warmer than in the anaerobic decomposition process. If the temperature of the gas from each gas well is measured, it is easy to discover whether or not air has been drawn into the refuse at the well.

More specifically the invention concerns a method of controlling the flow of landfill gas from sanitary landfills for domestic refuse and industrial waste, said method comprising drawing landfill gas out of gas wells, measuring the temperature of the gas withdrawn from each gas well, utilizing a temperature increase as an indication of too much landfill gas being withdrawn from the well, i.e. air having been drawn into the sanitary landfill at the gas well, and utilizing this information for controlling the flow of gas. The temperature is preferably measured by a temperature meter being disposed in the flow of gas from each gas well. The temperature can be read at regular intervals at each gas well, for example once a week. Furthermore, the measured values from the various temperature meters can be transferred to a central location by means of a cable or in other manner either continuously or at desired time intervals, and the measured values transferred to said central location can be recorded. Also, the measured values of the temperature meter can be utilized for manual or automatic control of the flow of gas from the gas well, and in addition an increased temperature can by means known per se be caused to give an alarm automatically, for example acoustically or optically.

The invention also concerns apparatus for performing the above mentioned method, said apparatus being connected to one or more gas wells and comprising a control chamber, a gas chamber, a gas fan, a plurality of temperature meters, a microprocessor, and a plurality of adjustment valves. The control chamber is connected to one or more of said gas wells and to said gas furnace over said gas fan, and the temperature meters are located each in a corresponding gas well and are connected to said microprocessor. The adjustment valves are located in the control chamber, and the microprocessor is connected to the adjustment valves. The microprocessor and adjustment valves are disposed to decrease the flow of withdrawn landfill gas from the corresponding gas wells on the basis of a temperature increase indicated by the temperature meter of the relevant gas well.

For practical purposes the relevant method and apparatus may generally be designed such, that each gas well is provided with a temperature meter which senses the temperature of the withdrawn gas. Information on the temperature of the gas can be collected, for example by an attendant visiting each gas well and making a notation of the temperature there or by the measured value being transferred to a central location by means of a cable either continuously or at short time intervals, with all of the temperature measurements being recorded at said central location, for example, by means of a printer or a microprocessor. The equipment may also be provided with an alarm function so that an increased temperature provides some kind of an alarm, for example accoustical, optical, etc.

The measured values of the temperature meters are used for controlling the gas flow from the gas well, for example by manual adjustment of a valve or by means of automatic control of the flow of gas with traditional control equipment.

As measuring the temperature and transferring and recording the measured value are carried out with simple and inexpensive components, a system of this type for continuously monitoring gas wells can be achieved at very low cost. As the utilized system components are well-proven standard components, the monitoring system will be lent a high degree of reliability.

BRIEF DESCRIPTION OF THE DRAWING

The accompanying FIGURE shows apparatus for performing the mentioned method. It is pointed out that the apparatus may be designed in a plurality of different ways and that the illustrated apparatus solely comprises an example.

DETAILED DESCRIPTION

In the FIGURE the designation 1 refers to a gas well which is connected to a control chamber 2, to which is connected a gas fan 3 having the purpose of via the control chamber 2 passing gas withdrawn from the gas well to a gas furnace 4 in which the gas is utilized for generating heat by combustion. The designation 5 refers to an appropriate temperature meter, and 6 is a microprocessor for recording, controlling and adjusting. In the control chamber 2 there is included an adjusting valve 7 for controlling the flow of gas, for example decreasing the flow of withdrawn landfill gas when the temperature of the gas increases.

For recovering landfill gas from sanitary landfills large cement tubes filled with macadam or gravel are sometimes used instead of perforated tubes. Horizontal perforated tube conduits or large domes which have been dug down into the surface of the landfill can also be utilized for recovering landfill gas. Temperature measuring can also in these cases be utilized as an indicator of drawing in air into the refuse.

I claim:

1. A method of controlling the flow of landfill gas from sanitary landfills for domestic refuse and industrial waste, comprising the steps of (a) drawing landfill gas out of gas wells, (b) measuring the temperature of the gas withdrawn from each gas well, (c) detecting and utilizing a temperature increase as an indication of too much landfill gas being withdrawn from the well, i.e. air having been drawn into the sanitary landfill at the gas well, and (d) utilizing information obtained by step (b) for controlling the flow of gas.

2. A method in accordance with claim 1, further comprising the steps of (b1) measuring the temperature by a temperature meter disposed in the flow of gas from each gas well and (b2) reading the temperature meters at regular intervals.

3. A method in accordance with claim 2, further comprising the steps of (b3) transferring the measured values from the various temperature meters to a central location during at least repeated desired time intervals and (b4) recording the measured values 4. A method in accordance with claim 2, further comprising the step of (b3) using the measured values from the temperature meter for manually controlling the flow of gas from the gas well.

5. A method in accordance with claim 2, further comprising the step of automatically giving an acoustical alarm responsive to said temperature increase detected in step (c).

6. A method in accordance with claim 1, further comprising the step of utilizing the method for gas recovery from sanitary landfills, said gas recovery being drawn out of a well taken from a class consisting of vertical perforated tubes, horizontal perforated tubes, cement ring wells, and gas collecting domes.

7. A method in accordance with claim 2, further comprising the step of (b3) using the measured values from the temperature meter for automatically controlling the flow of gas from the gas well.

8. A method in accordance with claim 3, further comprising the step of automatically giving an optical alarm responsive to said temperature increase detected in step (c).

* * * * *